United States Patent [19]

Hong et al.

[11] Patent Number: 5,342,658
[45] Date of Patent: Aug. 30, 1994

[54] ABRASION RESISTANT SILICONE COATING COMPOSITION

[75] Inventors: Young J. Hong; Jin B. Kim; Jong K. Yeo, all of Daejeon, Rep. of Korea

[73] Assignee: Lucky Limited, Seoul, Rep. of Korea

[21] Appl. No.: 997,207

[22] Filed: Dec. 28, 1992

[30] Foreign Application Priority Data

Dec. 30, 1991 [KR] Rep. of Korea ............ 91-25497

[51] Int. Cl.$^5$ .............. C08G 77/08; C08G 77/16; C08J 3/28
[52] U.S. Cl. .............. 427/515; 522/31; 522/83; 522/84; 522/172
[58] Field of Search .............. 522/31, 83, 84, 172; 427/515

[56] References Cited

U.S. PATENT DOCUMENTS 3,986,997 10/1976 Clark .................. 428/412
4,277,287 7/1981 Frye .................. 106/287.12
4,413,088 11/1983 Frye .................. 524/714

FOREIGN PATENT DOCUMENTS 2066278 7/1981 United Kingdom .......... 522/31

OTHER PUBLICATIONS

Chem. Abst., vol. 116, No. 8, p. 858, Abstract No. 72049j, Sakata.

Primary Examiner—Marion E. McCamish
Assistant Examiner—Arthur H. Koeckert
Attorney, Agent, or Firm—James D. Hall

[57] ABSTRACT

The present invention relates to an ultraviolet light curable coating composition having a shorter curing time and an excellent abrasion resistance, which comprises:

(A) an aqueous-alcoholic base resin dispersion containing, based on the weight of the total solids present in the base resin dispersion,
 (a) 5 to 75% by weight of a colloidal silica and
 (b) 25 to 95% by weight of a partial condensate of a silanol of formula:

$$R\,Si(OH)_3$$

wherein
R is a $C_{1-6}$ alkyl, $C_{6-20}$ aryl or hydroxy group; and
(B) an ultraviolet light curable catalyst of formula $$Ar_3S^+ MX_n^-$$

wherein
$Ar_3$ is a triphenyl, tri(4-methoxy)phenyl, tri(3,5-dimethyl-4-hydroxyphenyl), diphenyl-2,5-dimethylphenyl or tri(4-methyl) phenyl group; and
$MX_n^-$ is a metallic halide anion.

11 Claims, No Drawings

ABRASION RESISTANT SILICONE COATING COMPOSITION

FIELD OF THE INVENTION

The present invention relates to a silicone coating composition; and, more particularly, to a silicone coating composition capable of forming an excellent abrasion resistant film on a substrate through an ultraviolet light curing process.

BACKGROUND OF THE INVENTION

Recently, transparent glazing materials having a greater resistance to shattering than glass have been widely used for various purposes. For instance, transparent synthetic resin plates prepared from synthetic organic polymers are used as: wind shields for trains, automobiles and aircrafts; lenses for eye glasses and other optical devices; and window panes in public buildings, particularly because of their lighter weight than glass.

Despite the above advantages, however, synthetic resin plates also have certain defects in that their surface hardness and abrasion resistance are relatively low.

To overcome such problems, siloxane-containing coating compositions which form an abrasion resistant coating have been developed. For example, U.S. Pat. No. 3,986,997 discloses a heat curable coating composition, which comprises a dispersion of colloidal silica in a lower aliphatic alcohol-water solution of the partial condensate of a silanol of formula $R'SI(OH)_3$ wherein $R'$ is a $C_{1-3}$ alkyl, vinyl, 3,3,3-trifluoropropyl, $\gamma$-glycidoxypropyl or $\gamma$-methacryloxypropyl radical. However, this heat curable composition has a serious drawback requiring a longer curing time than, e.g., an acrylic functional ultraviolet light-curable coating composition.

Further, U.S. Pat. Nos. 4,348,454 and 4,201,808 disclose light-curable acrylic functional silicone compositions. The compositions proposed in the above patents have a shorter curing time; however, they still suffer from the disadvantages that the preparation methods are very complicated and the coating formed thereof has a relatively weaker abrasion resistance when applied on a substrate.

SUMMARY OF THE INVENTION

The present inventors have made continuous efforts to overcome the above-mentioned problems; and, as a result, have succeeded in deveoping an ultraviolet light-curable silicone composition capable of forming a surface coating that has a shorter curing time and yet provides a superior abrasion resistance.

It is, therefore, an object of the present invention to provide an ultraviolet light curable coating composition, which comprises:

(A) an aqueous-alcoholic base resin dispersion containing, based on the weight of the total solids in the base resin dispersion,
(a) 5 to 75% by weight of a colloidal silica and
(b) 25 to 95% by weight of a partial condensate of a silanol of formula:

$$R\ Si(OH)_3$$

wherein
R is a $C_{1-6}$ alkyl, $C_{6-20}$ aryl or hydroxy group; and (B) per 100 parts by weight of the total solids in the dispersion, 0.001 to 0.02 part by weight of an ultraviolet light-curable catalyst of formula:

$$Ar_3S^+MX_n^-$$

wherein
$Ar_3$ is a triphenyl, tri(4-methoxyphenyl), tri(3,5-dimethyl-4-hydroxyphenyl), diphenyl-2,5-dimethylphenyl or tri(4-methyl) phenyl group; and
$MX_n^-$ is a metallic halide anion.

It is another object of the present invention to provide a coating method of a substrate with the ultraviolet light-curable silicone composition of the present invention, which comprises coating the substrate with the composition, exposing the coated substrate to an ultraviolet light and, finally, heating the coated substrate.

DETAILED DESCRIPTION OF THE PREFERRED EMBODIMENTS

A colloidal silica is a sol or stable dispersion of amorphous silica particles. The colloidal silica can be prepared by acidifying an aqueous solution of sodium silicate or by hydrolyzing a silicon ester or halide at an ambient temperature. It is preferred to use the colloidal silica generally having an average particle size ranging from 1 to 150 $\mu$m, preferably 5 to 30 $\mu$m in order to obtain the dispersion having an excellent stability. The colloidal silica may have a single particle size or be a mixture of particles having different sizes, and is generally employed in an amount of 5 to 75% by weight based on the weight of the total solids in the base resin dispersion.

Such colloidal silica is well-known in the art and commercially available such as those marketed by E. I. du Pont de Nemours & Co. under the registered trademark of "Ludox" and by Nalco Chemical Company under the registered trademark of "Nalcoag".

A partial condensate of silanol can be prepared by the condensation of a silanol which may be represented by the formula $RSi(OH)_3$ (which is preferred) or $R_2Si(OH)_2$ wherein each R may be a $C_{1-6}$ alkyl, $C_{6-20}$ aryl or hydroxy group, as previously defined.

The silanol can be obtained in situ by adding the corresponding trialkoxysilane of formula $RSi(OC_nH_{2n+1})_3$, wherein R is the same as previously described and n is an interger of 1 to 4, to an aqueous dispersion of colloidal silica in the presence of an acid, as will be described in detail in Examples; and, preferably, 70% by weight or more of the silanol is $CH_3Si(OH)_3$. Suitable trialkoxysilanes are those containing methoxy, ethoxy, iso-propoxy and t-butoxy substituents, which liberate the corresponding alcohol upon hydrolysis. Upon formation of the silanol in the aqueous medium, the hydroxyl groups are subjected to the condensation to form a siloxane bond. A minor amount of an acid such as acetic acid may be added to promote the hydrolysis and the condensation reactions. The condensation of the hydroxyl groups is not carried out completely, and, therefore, some of the hydroxyl groups may still remain. The partial condensate of silanol(b) is suitably employed in an amount of 25 to 95% by weight based on the weight of the total solids present in the base resin dispersion.

The base resin dispersion can be preferably prepared in an alcohol-mixed aqueous solvent as a medium. An alcohol or a mixture of more than one alcohol may be added to the hydrolysis aqueous medium before or after the addition of trialkoxysilane. 80% by weight or more of the alcohol contained in the dispersion is preferably iso-propyl alcohol.

The base resin dispersion may comprise 15 to 50% by weight, preferably 25 to 40% by weight of solids, depending on the final purpose of the coating composition.

In order to achieve the desired characteristics of the cured coating, the base resin dispersion is preferably produced by adding a minor amount of an acid, e.g., acetic acid as a hydrolysis catalyst to a basic colloidal silica (if employing an acidic colloidal silica, generally the colloidal silica is added to acetic acid); introducing a trialkoxysilane to the resultant solution at a temperature ranging from 2° to 5° C. for the hydrolysis thereof; adding a suitable amount of an alcohol, e.g., isopropanol thereto; and aging the resultant alcoholic solution at a room temperature for 1 day.

The ultraviolet light-curable catalyst of the present invention is commonly called as 'onium salt' and may be represented by $Ar_3S^+MX_n^-$ wherein $Ar_3$ is a triphenyl, tri(4-methoxy)phenyl, tri(3,5-dimethyl-4-hydroxylphenyl), diphenyl-2,5-dimethylphenyl or tri(4-methyl)phenyl group; and $MX_n^-$ is a metallic halide anion such as $BF_4^-/AsF_6^-$, $PF_6^-$ or $SbF_6^-$. The catalyst serves to break the C-S bond and to generate an aryl radical and a strong Bronsted acid of formula $HMX_n$ wherein $MX_n$ is a metallic halide anion described above, upon the absorption of an ultraviolet light of a wavelength ranging from 190 nm to 365 nm, and, therefore, functions as a cationic polymerization initiator. Representative examples of the catalyst may include: triphenylsulfonium hexafluoroarsenate tri(4-methoxyphenyl) sulfonium hexafluoroarsenate tri(3,5-dimethyl-4-hydroxyphenyl) sulfonium hexafluoroarsenate diphenyl-2,5-dimethylphenyl sulfonium hexafluoroarsenate tri(4-methylphenyl) sulfonium hexafluoroarsenate and the like. The catalyst is generally employed in an amount of 0.001 to 0.02 part by weight and preferably 0.005 to 0.01 part by weight based on 100 parts by weight of the total solids in the dispersion.

The ultraviolet light-curable coating composition of the present invention can be easily obtained by preparing the base resin dispersion from the colloidal silica and the partial condensate of silanol and adding the ultraviolet light-curable catalyst and other additives thereto with stirring. In order to mix the above components thoroughly, the catalyst may be preferably charged in the form of a 1 wt % solution in methanol.

In addition to the above components, the coating composition of the present invention may also comprise an acid such as hydrofluoric acid, hydrochloric acid, nitric acid, sulfuric acid or acetic acid in an amount of 0.1 to 15 parts by weight based on 100 parts by weight of the dispersion for the stability of the composition.

The silicone coating composition of the present invention may further comprise a suitable organic solvent, depending on the substrate to be coated, in order to enhance the adhesion of the cured coating to the substrate. For example, when polymethyl-methacrylate(PMMA) is employed as the substrate, acetone(-which is preferred), 1,4-dioxane, methyl ethyl ketone and the like can be used. The suitable amount of the organic solvent is 20% by weight or less based on the weight of the coating composition. Such enhancement of the adhesion by addition of the organic solvent is derived from the fact that the colloidal silica contained in the composition penetrates into the swelled surface of PMMA substrate. On the other hand, when acetone is employed, it may further act as a source of hydrogen upon the decomposition of the 'onium salt' catalyst.

The final coating composition of the present invention thus prepared is preferably maintained at the pH of about an isoelectric point, e.g., 1.5 to 3, for the storage stability.

Hitherto, for many coating composition, the condensation reaction has been conducted at the pH higher than an isoelectric point by using a basic catalyst, however, the pH of the composition has been maintained at 6 to 7 for rapid curing; and, therefore, the prior composition had a poor storage stability.

Besides the above-mentioned components, the composition of the present invention may further comprise other additives such as surfactant, ultraviolet absorbent, thickening agent levelling agent for modifying the properties of the resultant cured coating.

The substrate to be coated is preferably cleaned and, optionally, primed before the coating process begins. Thereafter, the substrate may be applied with the coating composition of the present invention in a thickness ranging from 1 to 15 $\mu$m by using a conventional coating method, e.g., dipping, spraying, brushing, spinning, rolling, flowing or laminating.

Then, the substrate coated with the coating composition of the present invention is dried at a room temperature for 3 to 10 minutes, exposed to an ultraviolet light for 1 minute and heated for 10 to 20 minutes to cure the coating and evaporate the solvent. The curing temperature may range from 50° to 150° C., preferably 80° to 130° C. and more preferably 90° to 120° C. The silicone coating composition of the present invention is particularly useful for a substrate such as polycarbonates, acrylic polymers, poly(diethylene glycol bisallyl) carbonate, polyesters, cellulose acetate, butyrates, acrylonitrile-butadiene-styrene and the like.

The following Examples are intended to illustrate the present invention more specifically, without limiting the scope of the invention.

The properties of the coatings from the silicone coating compositions prepared in Examples and Comparative Examples were evaluated by the following methods. Unless otherewise instructed, all units, percentages, parts, etc. as used in the Examples and Comparative Examples are by weight.

(1) Abrasion Resistance(Taber Abrasion)

Abrasion resistance was determined by the methods in accordance with ASTM D 1044 and D 1003 as % change in haze.

(2) Scratch Resistance

Scratch resistance was measured by rubbing the surface of the coating with No. 00 or No. 000 steel wool horizontally set on the top of a cylinder having the diameter of 25 mm for 5 revolutions at 25 g loading, and observing the surface of the coating visually. The results are classified as follows:

0—not scratched

Δ—scratched lightly.

X—scratched severely.

(3) Adhesion

The adhesion of the cured coating to the substrate was measured by a cross cut cellotape peeling test, i.e., by pulling adhesive tape from a 1 mm crosshatched grid of the coating over the surface area of 100 mm$^2$. This procedure was repeated three times. The results are classified as follows:

0—not peeled.

Δ—when 1–50 grids are peeled.
X—when 51–100 grids are peeled.

EXAMPLE 1

Into a reactor were charged 13.86 g of Ludox SM-30 (having the particle size of 7 nm), 0.726 g of HS-30 (having the particle size of 12 nm) and 7.414 g of AS-40(having the particle size of 22 nm), which are the products of E. I. du Pont de Nemours & Co.; and, 2 g of acetic acid was added thereto. To the mixture was added dropwise 22.5 g of methyltrimethoxysilane over 1 hour with stirring to carry out the hydrolysis and the partial condensation reactions. 40 g of isopropanol was added thereto and the resultant solution was aged for 24 hours.

To 100 g of the base resin dispersion thus prepared were added 3.95 g of acetone and 3.84g of 1 wt % solution of triphenylsulonium hexafluoroarsenate dissolved in methanol. Finally, 6.02 g of acetic acid was added thereto with stirring to obtain the ultraviolet light-curable coating composition of the present invention.

The coating composition thus prepared was applied on polymethylmethacrylate, a substrate, in the thickness of about 1 μm by using the dipping method. The substrate applied with the coating composition was dried at a room temperature for 5 minutes, exposed to ultraviolet light for 1 minute by using Q-200001CT far-ultraviolet exposure equipment, a product of Quintel Limited, and heated at 90° C. for 10 minutes to evaporate the solvent. The properties of the cured coating were measured and the results are reported in Table 1.

EXAMPLE 2

The procedures described in Example I above were repeated except that said 1 wt % solution of triphenylsulfonium hexafluoroarsenate dissolved in methanol employed was in the amount of 7.52 g.

EXAMPLE 3

The procedures described in Example 1 above were repeated except that the second addition of acetic acid was employed in the amount of 10.15 g.

EXAMPLE 4

The procedures described in Example 1 above were repeated except that no second addition of acetic acid was employed.

EXAMPLE 5

The procedures described in Example 1 above were repeated except that neither acetone nor the second addition of acetic acid was used.

COMPARATIVE EXAMPLE 1

The procedures described in Example 1 above were repeated except that said triphenylsulfonium hexafluoroarsenate solution was not employed.

COMPARATIVE EXAMPLE 2

The procedures described in Example 1 above were repeated except that 1.3 g (0.001 mole) of choline acetate, which is a conventional heat curable catalyst known in the art, was employed as a catalyst.

COMPARATIVE EXAMPLE 3

The procedures described in Comparative Example 1 above were repeated except that choline acetate was replaced with 0.26 g (0.001 mole) of sodium acetate.

COMPARATIVE EXAMPLES 4 TO 6

The procedures described in Example 1 above were repeated except that said 1 wt % solution of triphenylsulfonium hexafluoroarsenate dissolved in methanol was employed in an amount of 10.99 g, 17.05 g and 28.84 g, respectively.

TABLE 1

| | Examples | | | | | Comparative Examples | | | | | |
|---|---|---|---|---|---|---|---|---|---|---|---|
| | 1 | 2 | 3 | 4 | 5 | 1 | 2 | 3 | 4 | 5 | 6 |
| Composition | | | | | | | | | | | |
| Base Resin Dispersion (g) | 100 | 100 | 100 | 100 | 100 | 100 | 100 | 100 | 100 | 100 | 100 |
| Catalyst (g) (1 wt % sol. in methanol) | 3.84 | 7.52 | 3.84 | 3.84 | 3.84 | | | | 10.99 | 17.05 | 28.84 |
| Heat Curing Catalyst  Choline Acetate (g) (10 wt % sol. in isopropanol) | | | | | | | 1.3 | | | | |
| Sodium Acetate (g) | | | | | | | | 0.26 | | | |
| Acetone (g) | 3.95 | 3.95 | 3.95 | 3.95 | | 3.95 | 3.95 | 3.95 | 3.95 | 3.95 | 3.95 |
| Acetic Acid (g) | 6.02 | 6.02 | 10.15 | | | | | | | | |
| Properties | | | | | | | | | | | |
| Coating Formation | Good | Good | Good | Good | Good | Good | Good | Good | Good | Good | Good |
| Scratch Resistance  #00 | 0 | 0 | 0 | 0 | 0 | X | 0 | 0 | Δ | Δ | Δ |
| #0 | 0 | 0 | 0 | 0 | 0 | X | Δ | Δ | X | X | X |
| Adhesion | 0 | 0 | 0 | 0 | 0 | Δ | Δ | Δ | X | X | X |
| Abrasion Resistance (Taber Abrasion) (% change in haze) | 1.4 | 2.2 | 1.8 | 2.0 | 2.5 | —[1] | 8.3 | 9.1 | —[1] | —[1] | —[1] |

Note [1]: The compositions which had bad (x) Scratch Resistance with #00 steel wool were not subjected to the test of Abrasion Resistance As shown in Table 1, the cured coatings formed from the coating compositions in accordance with the present invention exhibit superior physical properties such as scratch resistance, adhesion and abrasion resistance.

While the invention has been described in connection with the above specific embodiments, it should be recognized that various modifications and changes as may be apparent to those skilled in the art to which the invention pertains may be made and also fall within the scope of the invention as defined by the claims that follow.

What is claimed is:

1. An ultraviolet light curable coating composition, which comprises:

(A) an aqueous-alcoholic base resin dispersion containing, based on the weight of the total solids present in the base resin dispersion,
(a) 5 to 75% by weight of a colloidal silica and
(b) 25 to 95% by weight of a partial condensate of a silanol of formula:

$R\ Si(OH)_3$ wherein

R is a $C_{1-6}$ alkyl, $C_{6-20}$ aryl or hydroxy group; and
(B) per 100 parts by weight of the toal solids of the dispersion, 0.001 to 0.02 part by weight of an ultraviolet light curable catalyst of formula:

$Ar_3\ S^+ MX_n^-$ wherein $Ar_3$ is a triphenyl, tri(4-methoxy)phenyl, tri(3,5-dimethyl-4-hydroxyphenyl), diphenyl-2,5-dimethylphenyl or tri(4-methyl) phenyl group; and $MX_n^-$ is a metallic halide anion wherein the pH of said composition ranges from 1.5 to 3.

2. The composition of claim 1 wherein 70% by weight or more of the silanol comprises $CH_3Si(OH)_3$.

3. The composition of claim 1 wherein the catalyst is selected from the group consisting of triphenylsulfonium hexafluoroarsenate, tri(4-methoxyphenyl) sulfonium hexafluoroarsenate, tri(3,5-dimethyl-4-hydroxyphenyl) sulfonium hexafluoroarsenate, diphenyl-2,5-dimethylphenylsulfonium hexafluoroarsenate and tri(4-methylphenyl) sulfonium hexafluoroarsenate.

4. The composition of claim 1 wherein 80% by weight or more of the alcohol contained in the dispersion is iso-propyl alcohol.

5. The composition of claim 1 which further comprises 0.1 to 15 parts by weight of an acid based on 100 parts by weight of the dispersion.

6. The composition of claim 5 wherein the acid is selected from the group consisting of hydrofluoric acid, hydrochloric acid, nitric acid, sulfuric acid and acetic acid.

7. The composition of claim 1 which further comprises 20% by weight or less of an organic solvent based on the weight of the composition.

8. The composition of claim 7 wherein the organic solvent is selected from the group consisting of acetone, 1,4-dioxane and methyl ethyl ketone.

9. The composition of claim 1 wherein the colloidal silica has a single particle size or is a mixture of particles having different sizes.

10. A method for coating a substrate with the ultraviolet light curable silicone coating composition of claim 1, which comprises applying the composition on the substrate; exposing the coated substrate to an ultraviolet light and thereafter, heating the exposed substrate.

11. The method of claim 10 wherein the substrate is selected from the group consisting of polycarbonates, acrylic polymers, poly(diethylene glycol bisallyl) carbonate, polyesters, cellulose acetate, butyrates and acrylonitrile-butadiene-styrene.

* * * * *